United States Patent [19] [11] 3,862,109
Mitsuda et al. [45] Jan. 21, 1975

[54] METHOD FOR OBTAINING A PROTEIN ISOLATE FROM HYDROCARBON ASSIMILATING MICROBIAL CELLS

[75] Inventors: Hisateru Mitsuda; Kyoden Yasumoto; Benichiro Tonomura, all of Kyoto, Japan

[73] Assignee: Hitachi, Ltd., Tokyo, Japan

[22] Filed: Jan. 5, 1973

[21] Appl. No.: 321,318

Related U.S. Application Data

[63] Continuation-in-part of Ser. No. 864,659, Oct. 8, 1969, abandoned.

[30] Foreign Application Priority Data
Oct. 12, 1968 Japan.............................. 43-74391
Apr. 18, 1969 Japan............................. 44-30103

[52] U.S. Cl................ 260/112 R, 426/60, 426/204, 426/431
[51] Int. Cl.......................... C12d 13/06, A23j 3/00
[58] Field of Search.......... 195/3 R, 3 H, 28 R, 104, 195/105, 106; 99/14, 18; 260/112 R; 426/60, 431, 204

[56] References Cited
UNITED STATES PATENTS
2,567,378  9/1951  Kennedy et al...................... 195/66
3,268,412  8/1966  Champagnat et al................. 195/3
3,585,179  6/1971  Samejima et al............. 195/28 R X OTHER PUBLICATIONS
Neurath, "Dialysis and Ultrafiltration," The Proteins, Vol. 3, 1965.

*Primary Examiner*—James R. Hoffman
*Attorney, Agent, or Firm*—Craig & Antonelli

[57] ABSTRACT

A method for obtaining a protein isolate from hydrocarbon assimilating cells, which includes the steps of adding a solution of an inorganic calcium or barium compound to a solution containing protein, which has been isolated from hydrocarbon assimilating microbial cells, and dialyzing the solution prepared by adding the solution of the inorganic calcium or barium compound against a medium selected from the group consisting of water, a buffer solution and a dilute salt solution, whereby a desired protein isolate of high purity is obtained.

19 Claims, 1 Drawing Figure

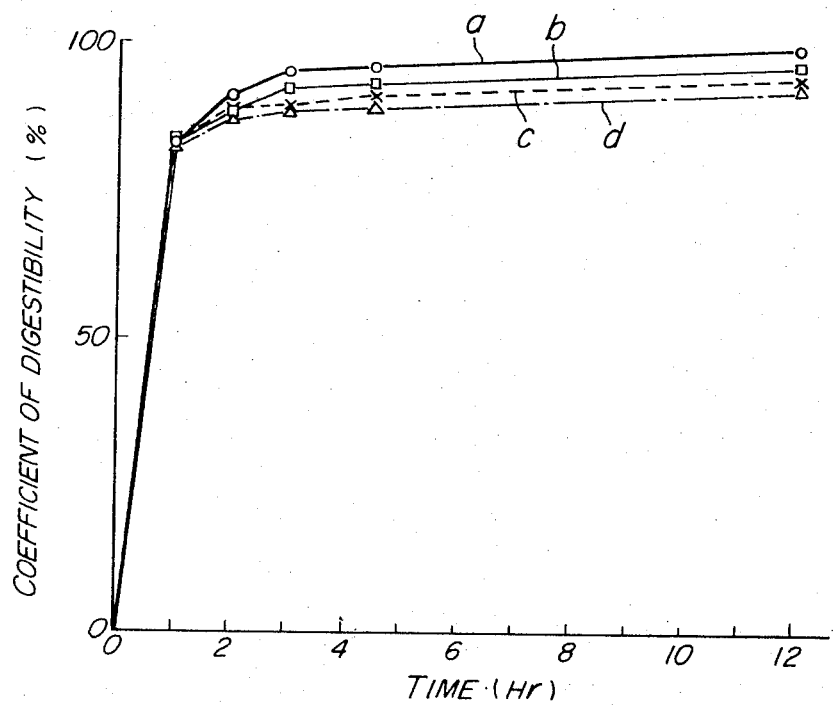

METHOD FOR OBTAINING A PROTEIN ISOLATE FROM HYDROCARBON ASSIMILATING MICROBIAL CELLS

This is a continuation-in-part application of application Ser. No. 864,659 filed on Oct. 8, 1969, and now abandoned.

The present invention relates to a method of isolating protein from hydrocarbon assimilating microbial cells. More particularly, this invention concerns a novel process for isolating and refining crude protein so as to obtain tasteless, odorless, digestible protein from petroleum hydrocarbon assimilating microbial cells in accordance with a simple procedure.

Recently, it has been discovered that certain kinds of microbial cells such as yeast, bacteria and fungus may be propagated using petroleum hydrocarbon as a carbon source. These petroleum hydrocarbon microbial cells, generally, contain a lot of proteins, amino acids and vitamins, and possess a high nutritive value. In addition, these microbial cells include the following features: (i) higher production rate than that of conventional food, plant and animal, (ii) higher nitrogen content, namely, higher protein content, (iii) easy production control and (iv) food production without employing the limited farm land. Therefore, these microbial cells gather the attention of various fields in the industry, since they represent an important food source of the future.

Petroleum hydrocarbon microbial cells, however, give out a peculiar odor due to the hydrocarbons used as the culture medium for the microbial cells and further because of low molecular weight organic compounds, which are produced by the microbial cells. As a result the direct utilization of these petroleum hydrocarbon microbial cells for the production of human food has been limited due to their taste. Further, these microbial cells are enveloped with poorly digestible substances such as cell wall, which are an obstacle to the utilization of these microbial cells for human food. The purer the proteins extracted and isolated from petroleum hydrocarbon assimilating microbial cell, the more digestible and the more suitable for human food. And possible toxic contaminants can be eliminated through the protein refining process.

Several techniques of separating proteins from microbial cells and chlorella have been set forth. For example, Japanese Patent Publication No. 12678/67 discloses a process for extracting protein by immersing the frozen and melted chlorella in a concentrated aqueous urea solution. Further, Japanese Patent Publication No. 547/69 discloses a process for extracting protein by immersing microbial cells, pretreated with a hydrogen chloride solution, in an alkaline solution. The processes for separating protein from these extracts by precipitation include methods based on the addition of hydrogen chloride, alcohol or trichloracetic acid until an isoionic point is reached, a precipitation method using an isoelectric point and so on. Meanwhile, there is a process wherein the cell walls of microbial cells are destroyed and thereafter protein is separated and isolated, such as the processes disclosed in U.S. Pat. Nos. 3,090,779 and 3,258,407.

However, the above-mentioned conventional processes, in many cases, may result in protein of low purity and involves extremely low efficiencies of extraction, and thus they are economically disadvantageous.

An object of the present invention is to provide a process for obtaining tasteless, odorless digestible protein.

Another object of the present invention is to provide a process for obtaining protein, which is suitable for human food, from petroleum assimilating microbial cells.

Further, another object of the present invention is to provide a process for obtaining high quality protein from petroleum assimilating cells by a relatively simple procedure.

Other objects and characteristics of the present invention will be understood by the detailed description mentioned below.

The present inventors have heretofore studied the techniques of separating protein from chlorella algae, torula yeasts and gram-positive bacteria being employed for the production of glutamic acid, and further the techniques of separating and isolating a protein from petroleum hydrocarbon assimilating microbial cells. The present inventors, as a result, attained the present invention described hereinafter.

The present invention relates to a method of isolating protein which includes, in the step of separating protein from a protein-containing solution, the addition of a calcium inorganic compound or barium inorganic compound to the protein extracts obtained from the microbial cells, removal of precipitate from the extracts and the dialysis of the solution free from precipitate against water, a buffer solution or a dilute salt solution.

The present invention is based on the discovery of the fact that, if a calcium compound or a barium compound is added to a protein-containing solution and subsequently if the thus produced mixture is dialyzed against water, a buffer solution or a dilute salt solution, protein of higher purity than that of the conventional methods is always obtainable.

The Figure is a graph which shows the results of digestibility tests on the proteins obtained by the present invention and milk casein, wherein $a$, represents milk casein; $b$, Candida lipolytica; $c$, Pseudomonas aeruginosa; and $d$, Corynebacterium petrophilum.

When a protein extract solution extracted from hydrocarbon assimilating microbial cells is dialyzed against water, a buffer solution or a dilute salt solution, precipitation of protein does occur but high purity protein is not obtained. Further, when a calcium or barium compound such as calcium chloride or barium chloride is added to a protein extracting solution, precipitation of protein does not occur. However, if, as mentioned above, a calcium or barium compound is added to a protein extract and subsequently if the thus produced protein-containing solution is dialyzed against water, a buffer solution or a dilute salt solution, the following three phenomena are observable. The reasons for the occurrence of such phenomena have not been clarified yet, but, since the different phenomena depending on the kinds of protein extract are observed, the kind of microbial cells used as a starting material is seemingly a factor of such phenomena.

1. Precipitate A is produced. This precipitate A is a protein. The addition of protein precipitants such an alcohol (e.g. ethanol) or acetone to the dialyzate, from which precipitate A has been removed, affords the precipitation pf precipitate B, which is a protein. In comparing the purities of the two, the protein of precipitate A is purer than that of precipitate B.

2. Precipitate A is produced. This precipitate A is a protein. The addition of an alcohol to the dialyzates, from which precipitate A has been removed, affords the precipitation of precipitate B. In this case, the protein of precipitate B is purer than that of precipitate A.

3. No precipitation is involved. The dialysis does not cause the precipitation, but the addition of protein precipitants, such as an alcohol, to the dialyzate affords the precipitation. The thus produced protein is purer than the protein precipitated by the process wherein a calcium or barium compound is added to a protein extracting solution and thereafter, without dialysis, alcohol is added.

The protein of the highest purity among those of the above-mentioned (1) to (3) phenomena, as is shown by Comparative Examples mentioned below, is purer than the protein obtained by the separation thereof from the protein extract in accordance with an isoionic precipitation method, an alcohol precipitation method or a trichloroacetic acid precipitation method.

Hydrocarbon assimilating microbial cells, without pretreatment, may directly be immersed in an extracting solution, or, after a suitable pretreatment, may be immersed in an extracting solution. The pretreatment includes immersing hydrocarbon assimilating microbial cells for 1 to 5 minutes in a heated aqueous solution at a temperature of 80° to 100°C. of hydrogen chloride, sulfuric acid, sodium hydroxide, potassium hydroxide or the like. This pretreatment improves the extracting rate of protein as compared with the non-treated case. This improvement is due to the fact that the cell wall of the microbial cells is destroyed and, in the subsequent extraction, the extracting solvent passing through the cell wall easily permeates into the inside of cell. The study of the present inventors has clarified the fact that a thick urea solution is usable as an extracting solvent for microbial cells. The employment of this urea solution affords the production of extremely highly pure proteins. In contrast, the employment of a conventional extracting solvent such as a 2% sodium hydroxide solution requires the above-mentioned addition of calcium or barium compound due to the extremely low purity of the obtained protein.

The thick urea solution as an extracting solvent is suitably an aqueous urea solution having a concentration of 2 to 12 mol/$l$. In this case, the higher the concentration of the urea solution, the more the extracting rate is improved, but more than 12 moles of urea cannot be dissolved in 1 $l$ of water at 30°C. Meanwhile, when a urea solution having a concentration of less than 2 mol/$l$ is employed, the extracting rate does not differ so much from that of the extraction by a single hot solution of hydrogen chloride, sulfuric acid, sodium hydroxide or potassium hydroxide, and thus the effect of the employment of a urea solution cannot be expected. Therefore the lowest concentration of urea solution is 2 mol/$l$. If the solution obtained by the extraction with urea solution is dialyzed to precipitate protein, the thus produced protein, as shown in the figure, exhibits a high digestibility which is comparable to that of milk casein. In this figure, each curve shows the results of a digestibility test with pepsin, in which 10 mg of pepsin is individually added to 500 mg of milk casein and four kinds of proteins obtained by the present invention and the prepared mixtures are individually dissolved in 50 ml. of hydrogen chloride solution of pH 1.8 to accomplish digestion.

The hydrocarbon assimilating microbial cells used in the present invention, for example, include the yeast, bacteria or the like which are propagated using petroleum hydrocarbon as a carbon source. More particularly, the hydrogen assimilating microbial cells include such bacteria as Achromobacter, Corynebacterium, Micrococcus, Pseudomonas, Mycobacterium, Nocardia, Actinomyces and the like, yeasts belonging to Candida, Pichia and Torulopsis groups and fungus belonging to Aspergillus, Penicilium and Fusarium groups.

The present invention is further described in detail by examples.

EXAMPLE 1

To the extracts extracted for 10 hours at 37°C. from Candida lipolytica, which is a kind of petroleum assimilating yeast, using 2% sodium hydroxide solution, barium hydroxide was added so as to give a final concentration of barium hydroxide of 3.3%. The insoluble substances were removed by centrifugal separation and the supernatant liquid was dialyzed against water to obtain a precipitate. This precipitate was gathered and freeze-dried to obtain a tasteless odorless sample powder of protein. The protein content of this powder was 90% by weight. This value was obtained by multiplying the analyzed nitrogen content by 6.25, and all protein contents hereinafter are expressed by this representation.)

When ethanol was added to the solution from which the above-mentioned precipitate had been removed so as to give the final concentration of ethanol being 50%, another precipitate was further obtained. The protein content of this precipitate was 60.5%.

Comparative Example 1

By dialyzing a protein extracting solution to which barium hydroxide had not been added against water, a precipitate was obtained, but the protein content of this precipitate was 21.4%. Further, ethanol was added to the dialyzate from which this precipitate had been removed so as to give a final concentration of 50%, and a precipitate was obtained. The protein content of this precipitate was 56%.

EXAMPLE 2

An extract from the same microbial cells as in Example 1 was dialyzed against running water for 24 hours, and the insoluble substances were removed by centrifugal separation. Thereafter calcium chloride was added to the dialyzate so as to give a final concentration of calcium dichloride of 3.3%, and the thus obtained solution was again dialyzed against running water to obtain a precipitate. The protein content of this precipitate was 87.9%. When ethanol was added to the supernatant from which the precipitate had been removed so as to give a final concentration of ethanol of 50%, a precipitate with a protein content of 64.5% was obtained.

Comparative Example 2

When ethanol was directly added to the original dialyzate of Example 2 without adding calcium chloride thereto so as to give a final concentration of ethanol of 50%, a precipitate was obtained. The protein content of this precipitate was 69.5%.

EXAMPLE 3

A dialyzate from the same microbial cell in Example 1 was neutralized with a 6N hydrogen chloride solution. Next, calcium chloride was added thereto so as to give the fianl concentration of 3.3%. Thereafter a resultant precipitates were removed by centrifugation, and the thus obtained solution was dialyzed against water. The precipitate produced by this procedure contained 80% of protein.

Comparative Example 3

When a 6N hydrogen chloride solution was added to a protein extracting solution so as to make the amount of precipitate the largest (pH 3.5), the protein content of the produced precipitate in the precipitation range was 64 to 69%.

EXAMPLE 4

A protein extract extracted from the same microbial cells as in Example 1 was dialyzed against water and the insoluble substances were removed. Barium chloride was added to the thus obtained dialyzate so as to give a final concentration of 3.3%. The resultant precipitate was removed by centrifugation and the thus obtained solution was again dialyzed against water to obtain a precipitate. The protein content of this precipitate was 72.9%. When ethanol was added to the solution from which this precipitate had been removed so as to give a final concentration of 50%, the produced precipitate contained 66.1% of protein.

Comparative Example 4

The precipitate obtained by adding ethanol to a original dialyzate of Example 4 so as to give the final concentration of 50%, without adding barium chloride thereto, contained 66 to 69% of protein.

EXAMPLE 5

Dried microbial cells of Pseudomonas aeruginosa, which is a kind of petroleum hydrocarbon assimilating microbial cell were extracted with 2% sodium hydroxide solution to obtain a protein extract. This extracting solution was dialyzed against water and the insoluble substances obtained were removed by centrifugation. Thereafter calcium chloride was added to this dialyzate so as to give a final concentration of 3.3%. The insoluble substances obtained were removed and the thus obtained solution was again dialyzed against water. The protein content of the thus produced precipitate was 89.6%. The precipitate obtained by adding ethanol to the supernatant from which this precipitate had been removed so as to give a final concentration of 30%, contained 99.3% of protein.

Comparative Example 5

The precipitate obtained by adding ethanol to a original dialyzate of Example 5 so as to give the final concentration of 30% without adding calcium chloride thereto contained 87.5% of protein.

EXAMPLE 6

A protein extract extracted from dried microbial cell of Corynebacterium petrophilum, which is a kind of petroleum hydrocarbon assimilating microbial cell, using 2% sodium hydroxide solution was dialyzed against water, and the insoluble substances obtained were removed. Thereafter, calcium chloride was added to a dialyzate so as to give the final concentration of 3.3%. After the removal of the produced precipitate, the so obtained was dialyzed against water, but in this case the precipitation did not occur. However, when ethanol was added to this dialyzate so as to give a final concentration of 30%, a precipitate with a protein content of 95.8% was produced. When, after the removal of this precipitate, a hydrogen chloride solution was added to the supernatant liquid so as to make the pH of said liquid 5.0, another precipitate was produced. This precipitate contained 93.1% of protein.

Comparative Example 6

The precipitate obtained when ethanol was directly added to the original dialyzate of Example 6 so as to give a final concentration of 30% contained 91.2% of protein, and the precipitate obtained when the supernatant liquid after the removal of the former precipitate was acidified with hydrogen chloride to pH 5.0 contained 89.3% of protein.

EXAMPLE 7

An extract extracted from the same microbial cells as in Example 1 was dialyzed against water and the insoluble substances obtained were removed by centrifugal separation. Thereafter calcium chloride was added to the obtained supernatant liquid so as to give a final concentration of 3.3%, and subsequently the thus obtained solution was dialyzed against a Tris-HCl buffer solution having a concentration of 0.01 mol/$l$ and a pH value of 7.5. A precipitate was produced and the protein content of this precipitate was 78%. When ethanol was added to the supernatant from which this precipitate had been removed so as to give a final concentration of 50%, a precipitate with a protein content of 58% was obtained.

Comparative Example 7

Even when a Tris-HCl buffer solution was added to a original dialyzate of Example 7 so as to give the final concentration of 0.01 mol/$l$ without adding calcium chloride thereto, precipitation hardly occurred. When ethanol was added to this solution so as to give a final concentration of 50%, a precipitate containing 62% protein was obtained.

EXAMPLE 8

A protein extract extracted from the same microbial cells as in Example 1 was dialyzed against water and then calcium chloride was added to the protein solution obtained after the removal of the insoluble substances obtained so as to give a final concentration of 3.3%. The solution from which the insoluble substances had been removed was dialyzed against 0.1% sodium chloride solution. The precipitate produced in this case contained 75% protein. When ethanol was added to the solution from which this precipitate had been removed so as to give the final concentration being 50%, a precipitate with a protein content of 59% was obtained.

Comparative Example 8

Even when sodium chloride was added to the original dialyzate of Example 8 so as to give a final concentration of 0.1% without adding calcium chloride thereto, precipitation did not occur. When ethanol was added to this solution so as to give a final concentration of 50%, a precipitate containing 62% protein was obtained.

EXAMPLE 9

Four kilograms of Corynebacterium petrophilum, which is a kind of petroleum hydrocarbon assimilating microbial cell cultivated on and harvested from a culture ground in which petroleum hydrocarbon is the main component of the carbon source, was suspended in 50 $l$ of 8 mol/$l$ urea solution, at a temperature of 40° to 50°C. for about 25 hours, and thereafter acidifed by acetic acid to pH 4.0 to complete the precipitation. This precipitate was filtered and 1.2 kg of protein was isolated. This corresponds to about 40% of the protein contained in the microbial cellular starting material.

EXAMPLE 10

Four kilograms of microbial cells obtained by cultivating Candida lipolytica, which is a kind of petroleum hydrocarbon assimilating yeast, on a culture ground in which n-paraffin is the main component was treated in the same manner as in Example 9 to obtain 0.6 kg of protein. This corresponds to about 38% of the protein in the starting yeast material.

EXAMPLE 11

Pseudomonas aeruginosa, which is a petroleum assimilating hydrocarbon microbial cell, was harvested from a culture ground in which petroleum hydrocarbon was the main component of the carbon source, and 4.0 kg of then microbial cells were treated in the same manner as in Example 9 to obtain 1.0 kg of protein. This amount corresponds to about 40% of the protein contained in the microbial cellular starting material.

EXAMPLE 12

1.0 kg portions of each of Candida lipolytica yeast, Corynebacterium petrophilum and Pseudomonas aeruginosa, which are petroleum assimilating hydrocarbon microbial cells, were heat-pretreated in 10$l$ of a 1N HCl or 1N NaOH solution at 100°C. for 1 or 3 minutes and thereafter individually neutralized with sodium hydroxide or hydrogen chloride. Thereafter, 10$l$ of 12 mol/$l$ urea solution was added thereto and the thus processed solutions were treated in the same manner as in Example 9 to obtain the results shown in Table 1.

Table 1

|  | Corynebacterium petrophilum | Candida lipolytica | Pseudomonas aeruginosa |
|---|---|---|---|
| Non-treated | 36.3(%) | 35.3(%) | 34.1(%) |
| 1N HCl 1 min. | 49.2 do. | 46.1 do. | 42.3 do. |
| 3N HCl 3 min. | 51.2 do. | 60.0 do. | 47.6 do. |
| 1N NaOH 1 min. | 66.2 do. | 68.4 do. | 50.6 do. |
| 3N NaOH 3 min. | 58.7 do. | 64.5 do. | 56.0 do. |

Table 1 shows the results when 20 $l$ of 6 mol/$l$ urea solution per 1.0 kg of microbial cells are added to carry out the extraction.

what is claimed is:

1. A process for separating proteins from microbial cells cultivated in hydrocarbons as a carbon source, which comprises contacting said microbial cells with an aqueous extracting solution to produce an extract in which proteins are dissolved and which further contains insoluble substances containing substantially no proteins dissolvable in said extracting solution; separating said insoluble substances from said extract; adding a compound selected from the group consisting of calcium chloride, barium hydroxide and barium chloride to the resultant extract in an amount sufficient to precipitate substances containing substantially no proteins but insufficient to precipitate proteins; separating the precipitated substances from said extract; dialyzing the resultant extract solution against a liquid selected from the group consisting of water, a buffer solution and a dilute salt solution to precipitate proteins from the resulting dialyzate; separating the precipitated proteins from said dialyzate; adding a liquid selected from the group consisting of ethanol and trichloroacetic acid to said dialyzate in an amount effective to precipitate proteins from said dialyzate; and separating the precipitated proteins from said dialyzate.

2. A process for separating proteins according to claim 1, wherein the microbial cells are contacted with a solution selected from the group consisting of a sodium hydroxide solution and a hydrogen chloride solution prior to extraction.

3. The process according to claim 1, wherein said extracting solution comprises a dilute aqueous alkaline solution.

4. The process according to claim 3, wherein said extracting solution comprises an aqueous solution of about 2% sodium hydroxide.

5. A process for separating proteins from microbial cells cultivated in hydrocarbons as a carbon source, which comprises contacting said microbial cells with an aqueous extraction solution to produce an extract in which said proteins are dissolved and which further contains insoluble substances containing substantially no proteins dissolvable in said extracting solution; separating said insoluble substances from said extract; adding a compound selected from a group consisting of a calcium chloride, barium hydroxide and barium chloride to said extract in such an amount as to precipitate no proteins but to precipitate substances containing substantially no proteins; separating said precipitated substances from said extract; dialyzing the resultant extract solution against a liquid selected from the group consisting of water, a buffer solution and a dilute salt solution; adding a liquid selected from the group consisting of ethanol and trichloacetic acid to the resultant dialyzate in an amount effective to precipitate proteins from said dialyzate; and separating the resulting proteins from said dialyzate.

6. A process for separating proteins from microbial cells cultivated in hydrocarbons as a carbon source, which comprises forming an aqueous extract of dissolved proteins free of insoluble substances; adding a compound selected from the group consisting of calcium chloride, barium hydroxide and barium chloride in such an amount as to precipitate no proteins but to precipitate substances containing substantially no proteins; separating the precipitated substances from said extract; dialyzing the resultant extract solution against a liquid selected from the group consisting of water, a buffer solution and a dilute salt solution; separating any proteins precipitated during said dialysis from the resulting dialyzate; adding a protein precipitant to the resulting dialyzate in an amount effective to precipitate protein from said dialyzate; and separating the resulting precipitated proteins from said dialyzate.

7. A process for separating proteins according to claim 6, wherein the microbial cells are contacted with a solution selected from the group consisting of a sodium hydroxide solution and a hydrogen chloride solution prior to formation of said aqueous extract whereby the extraction rate of proteins is improved.

8. A process for separating proteins according to claim 6, wherein said protein precipitant is selected from the group consisting of ethanol and trichloroacetic acid.

9. The process according to claim 6, wherein when the concentration of the calcium chloride, barium hydroxide, or barium chloride in the extract when subjected to dialysis is about 3%.

10. The process of claim 6, wherein said microbial cells are selected from the group consisting of bacteria, yeast and fungus.

11. The process according to claim 10, wherein said bacteria is selected from the group consisting of Achromobacter, Crynebacterium, Micrococcus, Pseudomonas, Mycobacterium, Nocardia, and Actinomyces; wherein said yeast is selected from the group consisting of Candida, Pichia and Torulopsis; and wherein said fungus is selected from the group consisting of Aspergillus, Penicilium and Fusarium.

12. The process according to claim 6, wherein said microbial cells are Candida lipolytica.

13. The process according to claim 6, wherein said microbial cells are Pseudomonas aeruginosa.

14. The process according to claim 6, wherein said microbial cells are Corynebacterium petrophilum.

15. A process for separating proteins from microbial cells cultivated in hydrocarbons as a carbon source, which comprises forming an aqueous extract of dissolved proteins free of insoluble substances; adding a compound selected from the group consisting of calcium chloride, barium hydroxide and barium chloride in such an amount as to precipitate no proteins but to precipitate substances containing substantially no proteins; separating the precipitated substances from said extract; dialyzing the resultant extract solution against a liquid selected from the group consisting of water, a buffer solution and a dilute salt solution; and separating any proteins precipitated during said dialysis from the resulting dialyzate.

16. The process according to claim 15, wherein said microbial cells are selected from the group consisting of bacteria of the Pseudomonas group and yeasts of the Candida group.

17. The process according to claim 16, wherein said microbial cells are Candida lipolytica.

18. The process according to claim 16, wherein said microbial cells are Pseudomonas aeruginosa.

19. A process for separating proteins from microbial cells cultivated in hydrocarbons as a carbon source, which comprises contacting said microbial cells with an aqueous extracting solution to produce an aqueous extract in which proteins are dissolved; separating insoluble substances from said extract; adding a compound selected from the group consisting of calcium chloride, barium hydroxide and barium chloride to the resultant extract in an amount sufficient to precipitate substances containing substantially no proteins but insufficient to precipitate proteins; separating the precipitated substances from said extract; dialyzing the resultant extract solution against a liquid selected from the group consisting of water, a buffer solution and a dilute salt solution to precipitate proteins from the resulting dialyzate; and separating the precipitated proteins from said dialyate.

* * * * *